INVENTORS
R. F. BREWER
C. W. HENDERSON
BY *W. A. Parnell*
ATTORNEY

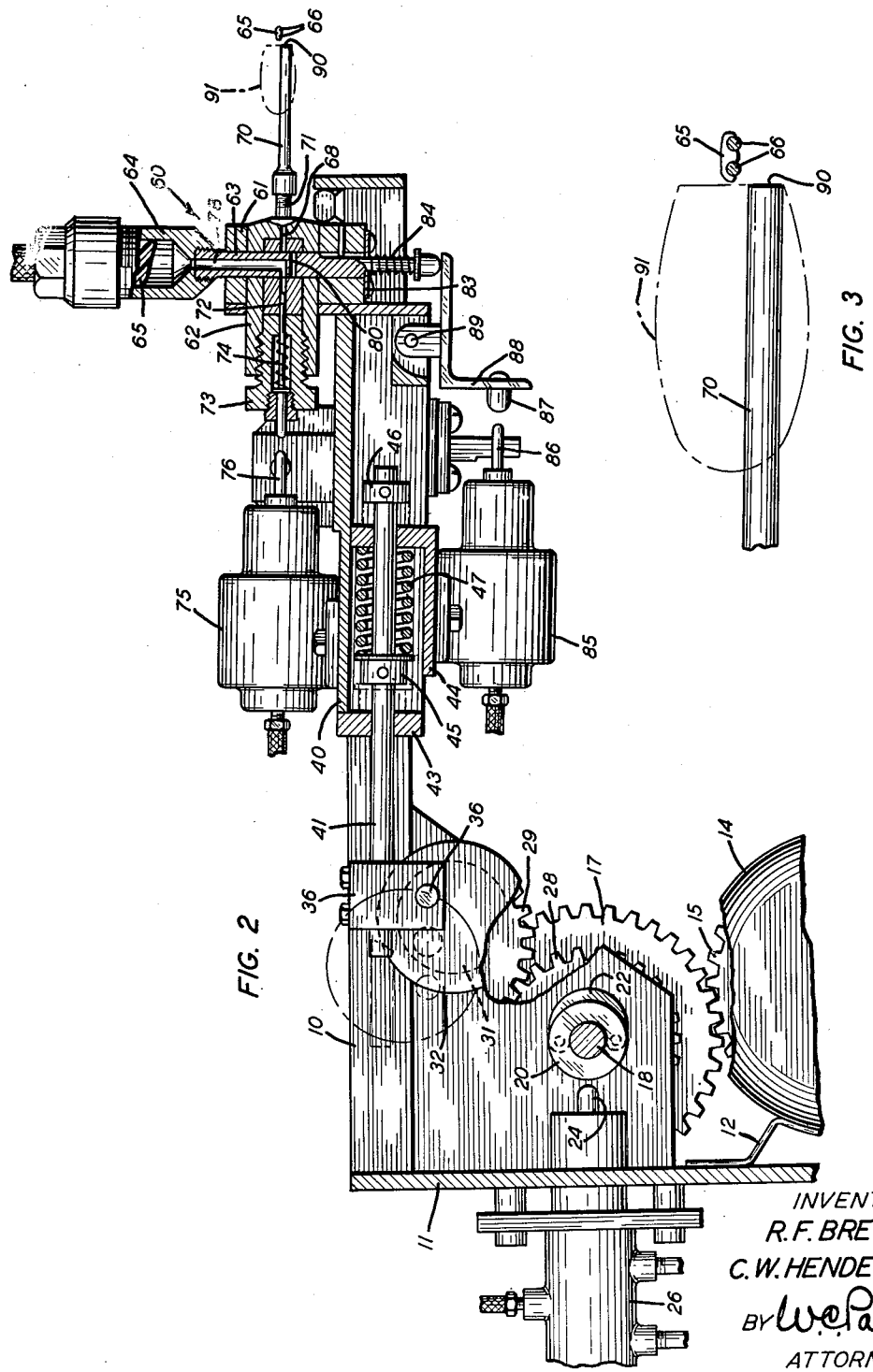

Patented Feb. 26, 1952

2,587,284

UNITED STATES PATENT OFFICE 2,587,284

MATERIAL EJECTING AND FEEDING APPARATUS

Robert F. Brewer, Quakertown, and Clifford W. Henderson, Emmaus, Pa., assignors to Western Electric Company, Incorporated, New York, N. Y., a corporation of New York Application April 12, 1950, Serial No. 155,504

8 Claims. (Cl. 118—323)

This invention relates to a material ejecting and feeding apparatus and more particularly to apparatus for ejecting measured quantities of thermistor material and feeding them intermittently to parallel wires in the process of forming thermistor units.

Thermistor units of this type have been made by hand depending upon the skill of the individual to place the desired amounts of thermistor material at accurate locations on the wires. With this method it was difficult to produce a uniform product.

An object of the invention is to provide an apparatus which is simple in structure and efficient in operation for ejecting like quantities of material intermittently and feeding them to an article.

With this and other objects in view, the invention comprises a material ejecting and feeding apparatus including a hollow element movable in a given path relative to an article and associated with a feeding mechanism operable during given intervals of time in which the element is moved to eject known quantities of material from the element and feed the material to the article.

More specifically the apparatus includes a carriage supported on a pivot which is movable toward and away from longitudinally advancing wires whereby the material feeding unit supported by the carriage, particularly the hollow feeding element of the unit, may be moved in a circuitous path relative to the wires to feed like quantities of the material intermittently to the wires. An eccentric included in the driving mechanism operatively connected to the carriage tends to impart an elliptical motion to the end of the feeding element but an adjustable stop interrupts the forward motion of the carriage causing a straight downward movement of the end of the feeding element while feeding each quantity of material to the wires.

Other objects and advantages will be apparent from the following detailed description when considered in conjunction with the accompanying drawings, wherein.

Fig. 2 is a side elevational view of the apparatus, portions thereof being shown in section; and Fig. 3 is a schematic illustration of the path of movement of the leading end of the feeding element during the application of the quantities of material to the wires.

Figure 1:
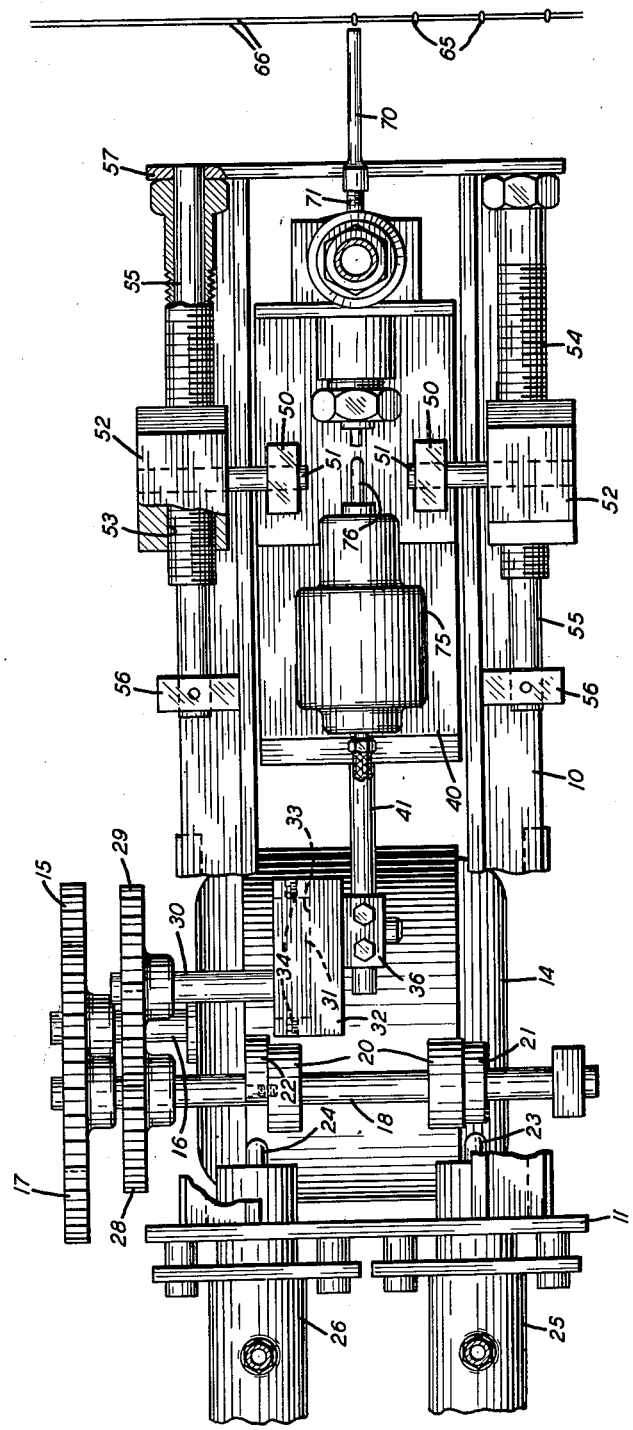
Fig. 1 is a top plan view of the apparatus, portions thereof being shown in section while other portions are broken away.

Referring now to the drawings, the apparatus includes a stationary frame 10 which is rectangular in general contour having a downwardly extending end portion 11 upon which a bracket 12 is mounted for supporting an electric motor 14. A gear 15 is mounted on the shaft 16 of the motor to drive a gear 17 mounted on a cam shaft 18. The cam shaft 18 is journalled in suitable bearings supported by the frame 10 and has collars 20 mounted thereon to which are secured cams 21 and 22. The cams 21 and 22 are disposed at their respective positions to engage plungers 23 and 24 respectively of valves 25 and 26 for a purpose hereinafter described.

A gear 28 mounted on the cam shaft 18 drives a gear 29 which is mounted on a shaft 30. The shaft 30 is journalled in suitable bearings (not shown) supported by the frame 10 and has a disc-like member 31 eccentrically mounted on the inner end thereof. This member, together with its adjustable cup-like member 32 may hereinafter be described as an eccentric element. The member 32 is hollow at 33 to receive the member 31 and may be adjusted on the member and secured in any desired position by means of set screws 34. A pivotal connection 36 supported by the member 32 at a given position may be adjusted relative to the axis of the shaft 30 to vary the stroke of the pivotal connection 36 by adjusting the position of the member 32 on the member 31.

The pivotal connection 36 is the connecting means between the power means just described and a carriage 40 through a rod 41 having its outer end secured to the pivotal connection 36 at any desired position. The connection of the rod 41 with the carriage 40 is shown more in detail in Fig. 2 where the arm extends through apertures in parallel members 43 and 44 and is provided with fixed collars 45 and 46 positioned to engage their respective parallel members when urged into normal position by a spring 47.

As shown in Fig. 1, the carriage 40 has vertical lugs 50 rigidly mounted thereon to receive, in aligned apertures thereof, aligned pivot pins 51 carried by adjustable supports 52. The supports 52 have threaded apertures 53 therein to receive like threaded elements 54 which are hollow and are supported concentrically on their respective rods 55. The rods 55 have their left ends fixedly mounted in apertured lugs 56 which are rigidly mounted on the frame 10 while the right ends of the rods 55 are supported in apertures in laterally extending portions 57 of the frame 10 which serve as stops for the carriage.

A feeding unit 60 mounted on the carriage 40 includes a main support 61 laterally apertured to receive a housing 62 and vertically apertured to receive a valve 63 which extends also through a vertical aperture in the housing. A receptacle 64 for material 65 is mounted on the upper end of the valve 63. The material 65 is to be fed in measured quantities to an article such as parallel wires 66 as the wires are advanced longitudinally.

The housing 62 includes a longitudinal aperture 68 communicating with the hollow passageway through a needle-like feeding element 70 which is mounted on a reduced portion 71 of the housing. A plunger 72 in the passageway 68 is reciprocably movable in a hollow plug 73 closing one end of the housing, the plunger being normally urged to the left by a spring 74. An air cylinder 75 mounted on the carriage 40, and under the control of the valve 26, has a plunger 76 which, when actuated, will engage the outer end of the plunger 72 to move it a given distance against the force of its spring 74.

The valve 63 has an L-shaped passageway 78 communicating at its upper end with the inner portion of the receptacle 64 and at its lower end with the passageway 68 when the valve is in its normal position shown in Fig. 2. Another passageway 80 extending laterally through the valve 63 beneath the passageway 78 is positioned to be aligned with the divided portions of the passageway 68 and the plunger 72 when the valve is moved into its operated position from its stop 83 and against the force of its spring 84. The valve 63 is moved into its upper position through the operation of an air cylinder 85 which is mounted on the under surface of the carriage 40 and is under the control of the valve 25. The air cylinder 85 has a plunger 86 which will be moved outwardly upon operation of the air cylinder to engage a lug 87 of a lever 88 and move it about its pivot 89 to cause upward movement of the valve 63 from its normal position shown in Fig. 2 to its operated position where the passageway 80 will be in alignment with the portions of the passageway 68.

Considering now the operation of the apparatus, let it be assumed that the apparatus is in its normal position with the carriage moved to a position where the leading end 90 of the feeding element 70 is away from the wires 66. It should also be understood that the passageway 80 and the forward portion of the passageway 68, together with the feeding element 70 are completely filled with the material 65. During each operating cycle of the apparatus, a measured quantity of the material is drawn from the passageway 78 by the plunger 72 assisted by the force of gravity or pressure in the receptacle 64, to fill that portion of the passageway 68 between the inner end of the plunger and the valve 63. This given quantity of material during each operating cycle of the apparatus is added to that already present in the passageways 80 and 68 leading toward the element 70 and also the material filling the element whereby, when this measured quantity of material, through the operation of the plunger 72, is forced into the passageway 80 of the valve, a like quantity is ejected from the outer end of the feeding element 70 and fed to the wires.

The intermittent feeding operations are the result of the interrupted elliptical motions imparted to the carriage and the feeding unit, particularly to the outer end 90 of the feeding element during the continuous driving of the mechanism from the motor 14 through the train of gears and the eccentric element. This motion imparts two motions to the carriage, one a longitudinal motion causing the carriage with its pivots 51 and its adjustable threaded members 54 to travel longitudinally on the rods 55, this motion being free to the left, but interrupted to the right by the threaded elements 54 striking their stops 57. The second motion is a rocking motion of the carriage about its pivots as the pivotal connection 36 rides about the axis of the shaft 30 and this pivotal motion when combined with the longitudinal motion of the carriage imparts an interrupted elliptical motion as indicated at 91 in Figs. 2 and 3.

At given intervals of time, during each operating cycle of the apparatus to impart the interrupted elliptical motion to the feeding end of the element 70, the cams 21 and 22 on the cam shaft 18 actuate the plungers 23 and 24 of their respective valves 25 and 26 to reciprocate the valve 63 of the feeding unit 60 and to cause operation of the plunger 72. The plunger 72 in moving to the left under the control of its spring 74 is effective in causing a measured quantity of material to be removed from the passageway 78 and when moved to the right, the plunger will force this measured quantity of material into the passageway 80 causing a like quantity of material to be ejected from the feeding end of the element which at that time is positioned above the wires 66 so that during the downward movement of the feeding end 90 of the element 70 in its straight line, will feed this measured amount of material to the wires forcing it down around the wires.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus operable through repeated cycles to eject given quantities of a material intermittently and feed them to spaced positions on a longitudinally advanced article, the apparatus comprising a unit including a hollow feeding element, a receptacle for the material, means actuable to force quantities of the material through the feeding element and eject them from the element, a carriage for supporting the unit mounted for longitudinal and rocking movement, means operable to impart rocking and longitudinal movement to the carriage whereby the outlet end of the element will move in a circuitous path relative to the article to first position the ejected quantities of material above the article and then lay the quantities of material on the articles, and variable means in the mounting means for the carriage for controlling the movement of the carriage relative to the article and the location of the quantities of material on the article.

2. An apparatus operable through repeated cycles to eject given quantities of a material intermittently and feed them to spaced positions on a longitudinally advanced article, the apparatus comprising a unit including a hollow feeding element, a receptacle for the material, a measuring chamber, a valve actuable to alternately connect the chamber to the receptacle and the element, a member movable in one direction in the chamber to draw measured quantities of the material from the receptacle into the chamber and movable in another direction to force the measured quantities of material through the feeding element, a carriage for supporting the unit mounted for longitudinal and rocking movement, and means operable to impart rocking and longitudinal movement to the carriage whereby the outlet end of the element will move in a circuitous path relative to the article to first position the ejected quantities of material above the article and then lay the quantities of material on the articles.

3. An apparatus operable through repeated cycles to eject given quantities of a material intermittently and feed them to spaced positions on a longitudinally advanced article, the apparatus comprising a unit including a hollow feeding element, a receptacle for the material, a measuring chamber, a valve actuable to alternately connect the chamber to the receptacle and the element, a member movable in one direction in the chamber to draw measured quantities of the material from the receptacle into the chamber and movable in another direction to force the measured quantities of material through the feeding element, a carriage for supporting the unit mounted for longitudinal and rocking movement, means operable to impart given motions to the carriage whereby the outlet end of the element will move in a circuitous path relative to the article to first position the ejected quantities of material above the article and then lay the quantities of material on the articles, and separate means for actuating the valve and reciprocating the member in timed relation with the movement of the carriage.

4. An apparatus operable through repeated cycles to eject given quantities of a material intermittently and feed them to spaced positions on a longitudinally advanced article, the apparatus comprising a unit including a hollow feeding element, a receptacle for the material, a measuring chamber, a valve actuable to alternately connect the chamber to the receptacle and the element, a member movable in one direction in the chamber to draw measured quantities of the material from the receptacle into the chamber and movable in another direction to force the measured quantities of material through the feeding element, a carriage for supporting the unit mounted for longitudinal and rocking movement, means operable to impart given motions to the carriage whereby the outlet end of the element will move in a circuitous path relative to the article to first position the ejected quantities of material above the article and then lay the quantities of material on the articles, fluid operated plungers for actuating the valve and reciprocating the member, and cam operated valves actuated in timed relation with the movement of the feeding element and the carriage to operate the plungers.

5. An apparatus operable through repeated cycles to eject given quantities of thermistor material intermittently and feed them to spaced positions on longitudinally advanced spaced parallel wires, the apparatus comprising a hollow feeding element, a receptacle for the material, means to extrude quantities of the material through the feeding element and eject them from the element, and means operable to move the feeding element relative to the wires whereby the quantities of thermistor material will be laid on the wires.

6. An apparatus operable through repeated cycles to eject given quantities of a material and intermittently feed them to spaced positions on a longitudinally advancing strand, the apparatus comprising a movable carriage, a pivot therefor, a laterally movable support for the pivot, a hollow feeding element supported by the carriage and movable therewith, a receptacle for the material, means to receive quantities of the material from the receptacle, force them through the feeding element and eject them singly during each cycle of movement of the carriage, and means to move the carriage about its pivot and with its laterally movable support to cause the outlet end of the ejecting element to successively move in a substantially elliptical path laterally of the strand to successively lay the quantities of material on the strand at spaced positions.

7. An apparatus operable through repeated cycles to eject given quantities of a material and intermittently feed them to spaced positions on a longitudinally advancing strand, the apparatus comprising a movable carriage, a pivot therefor, a laterally movable support for the pivot, a hollow feeding element supported by the carriage and movable therewith, a receptacle for the material, means to receive quantities of the material from the receptacle, force them through the feeding element and eject them singly during each cycle of movement of the carriage, and means to move the carriage about its pivot and with its laterally movable support to cause the outlet end of the ejecting element to successively move in a substantially elliptical path laterally of the strand to successively lay the quantities of material on the strand at spaced positions, and means to interrupt the movement of the laterally movable support to cause the outlet end of the element with each quantity of material to move in substantially a straight path laterally of the strand during laying of the quantities of material on the strand.

8. An apparatus operable through repeated cycles to eject given quantities of a material and intermittently feed them to spaced positions on a longitudinally advancing strand, the apparatus comprising a movable carriage, a pivot therefor, a laterally movable support for the pivot, a hollow feeding element supported by the carriage and movable therewith, a receptacle for the material, means to receive quantities of the material from the receptacle, force them through the feeding element and eject them singly during each cycle of movement of the carriage, means to move the carriage about its pivot and with its laterally movable support to cause the outlet end of the ejecting element to successively move in a substantially elliptical path laterally of the strand to successively lay the quantities of material on the strand at spaced positions, a stop for the support, and means to vary the relationship between the stop and the support to cause the outlet end of the element with each quantity of material to move in a substantially straight path laterally of and variable distances from the strand to lay the quantities of material uniformly on spaced portions of the strand.

ROBERT F. BREWER.
CLIFFORD W. HENDERSON.

REFERENCES CITED

The following references are of record in the file of this patent:

UNITED STATES PATENTS

| Number | Name | Date |
| --- | --- | --- |
| 2,029,922 | Heckel et al. | Feb. 4, 1936 |
| 2,081,758 | Milmoe | May 25, 1937 |
| 2,123,354 | Corse | July 12, 1938 |
| 2,218,071 | Pohle | Oct. 15, 1940 |
| 2,296,861 | Matter | Sept. 29, 1942 |

FOREIGN PATENTS

| Number | Country | Date |
| --- | --- | --- |
| 461,386 | Great Britain | Feb. 16, 1936 |